US009830067B1

(12) United States Patent
Jitkoff

(10) Patent No.: US 9,830,067 B1
(45) Date of Patent: *Nov. 28, 2017

(54) CONTROL OF DISPLAY OF CONTENT WITH DRAGGING INPUTS ON A TOUCH INPUT SURFACE

(71) Applicant: GOOGLE INC., Mountain View, CA (US)

(72) Inventor: John Nicholas Jitkoff, Palo Alto, CA (US)

(73) Assignee: GOOGLE INC., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/494,571

(22) Filed: Sep. 23, 2014

Related U.S. Application Data

(63) Continuation of application No. 13/300,401, filed on Nov. 18, 2011, now Pat. No. 8,875,046.

(60) Provisional application No. 61/415,179, filed on Nov. 18, 2010, provisional application No. 61/458,326, filed on Nov. 18, 2010.

(51) Int. Cl.
*G06F 3/0488* (2013.01)
*G06F 3/0485* (2013.01)

(52) U.S. Cl.
CPC .................. *G06F 3/04855* (2013.01)

(58) Field of Classification Search
None
See application file for complete search history.

(56) References Cited

U.S. PATENT DOCUMENTS

| 5,252,951 A | 10/1993 | Tannenbaum et al. |
| 5,305,435 A | 4/1994 | Bronson |
| 5,339,391 A | 8/1994 | Wroblewski et al. |
| 5,568,604 A | 10/1996 | Hansen |
| 5,714,971 A | 2/1998 | Shalit et al. |
| 5,745,096 A | 4/1998 | Ludolph et al. |
| 5,784,058 A | 7/1998 | LaStrange et al. |
| 5,784,059 A | 7/1998 | Morimoto et al. |
| 5,864,330 A | 1/1999 | Haynes |
| 6,020,887 A | 2/2000 | Loring et al. |
| 6,233,591 B1 | 5/2001 | Sherman et al. |

(Continued)

FOREIGN PATENT DOCUMENTS

| CN | 1980443 A | 6/2007 |
| CN | 101212752 A | 7/2008 |

(Continued)

OTHER PUBLICATIONS

International Search Report and Written Opinion for International Application No. PCT/US2011/061538, dated Mar. 9, 2012, 11 pages.

(Continued)

*Primary Examiner* — Tuan S Nguyen
(74) *Attorney, Agent, or Firm* — Brake Hughes Bellermann LLP

(57) ABSTRACT

A computer-implemented user interface method includes displaying content in a first window on a display of a computing device, receiving a dragging user input on an element at a periphery of the window, and in response to receiving the dragging input, generating and displaying a second window on the display of the computing device and displaying the first window simultaneously with the second window.

26 Claims, 12 Drawing Sheets

(56) References Cited

U.S. PATENT DOCUMENTS

| | | |
|---|---|---|
| 6,271,824 B1 | 8/2001 | Chang |
| 6,757,002 B1 | 6/2004 | Oross et al. |
| 7,705,833 B2 | 4/2010 | Kim |
| 7,900,141 B2 | 3/2011 | Kang |
| 8,266,529 B2 | 9/2012 | Ooi et al. |
| 8,736,557 B2 | 5/2014 | Chaudhri |
| 8,875,046 B2 | 10/2014 | Jitkoff |
| 2006/0061550 A1 | 3/2006 | Fateh |
| 2007/0236476 A1 | 10/2007 | Suzuki |
| 2007/0252822 A1 | 11/2007 | Kim et al. |
| 2008/0282173 A1* | 11/2008 | Kim .................. G06F 3/04855 715/747 |
| 2009/0002335 A1 | 1/2009 | Chaudhri |
| 2009/0193351 A1* | 7/2009 | Lee .................. G06F 3/0482 715/769 |
| 2009/0249235 A1* | 10/2009 | Kim .................. G06F 3/0481 715/765 |
| 2010/0056221 A1* | 3/2010 | Park .................. G06F 3/048 455/566 |
| 2010/0058226 A1 | 3/2010 | Flake et al. |
| 2010/0081475 A1* | 4/2010 | Chiang .................. G06F 3/0483 455/564 |
| 2010/0100841 A1 | 4/2010 | Shin et al. |
| 2010/0107067 A1 | 4/2010 | Vaisanen |
| 2010/0131880 A1 | 5/2010 | Lee et al. |
| 2010/0302172 A1 | 12/2010 | Wilairat |
| 2011/0138321 A1 | 6/2011 | Allen, Jr. et al. |
| 2011/0163969 A1 | 7/2011 | Anzures et al. |

FOREIGN PATENT DOCUMENTS

| | | | |
|---|---|---|---|
| CN | 101404687 A | | 4/2009 |
| CN | 101452365 A | | 6/2009 |
| CN | 101667096 A | | 3/2010 |
| EP | 0493990 A2 | | 7/1992 |
| EP | 2045700 A1 | | 4/2009 |
| EP | 2076000 A2 | | 7/2009 |
| EP | 2116927 A2 | | 11/2009 |
| EP | 2120131 A2 | | 11/2009 |
| EP | 2166445 A2 | | 3/2010 |
| JP | H0869473 A | | 3/1996 |
| JP | 2003-195998 A | | 7/2003 |
| JP | 2006-285373 A | | 10/2006 |
| JP | 2007-280019 A | | 10/2007 |
| JP | 2009-276926 A | | 11/2009 |
| JP | 2010-097353 A | | 4/2010 |
| WO | 2010/092993 A1 | | 8/2010 |

OTHER PUBLICATIONS

International Search Report and Written Opinion for International Application No. PCT/US2011/061527, dated May 6, 2012, 14 pages.
Non-Final Office Action received for U.S. Appl. No. 13/300,438, dated Nov. 8, 2013, 25 pages.
Final Office Action received for U.S. Appl. No. 13/300,438, dated Aug. 1, 2014, 27 pages.
Advisory Action received for U.S. Appl. No. 13/300,438, dated Feb. 5, 2015, 3 pages.
Non-Final Office Action received for U.S. Appl. No. 13/300,438, dated Mar. 31, 2015, 27 pages.
Final Office Action received for U.S. Appl. No. 13/300,438, dated Feb. 1, 2016, 28 pages.
Office Action received for Australian Patent Application No. 2011329649, dated Mar. 18, 2016, 2 pages.
Office Action received for Chinese Patent Application No. 201180062779.4, dated Aug. 14, 2015, 19 pages.
Office Action received for Chinese Patent Application No. 201180062779.4, dated Mar. 4, 2016, 21 pages.
Office Action received for Chinese Patent Application No. 201180064601.3, dated Oct. 27, 2015, 39 pages.
Office Action received for Japanese Patent Application No. 2013-540091, dated Nov. 2, 2015, 4 pages. (Official Copy only).
Office Action received for Japanese Patent Application No. 2013-540088, dated Nov. 9, 2015, 4 pages. (Official Copy only).
Office Action received for Japanese Patent Application No. 2013-540088, dated May 31, 2016, 4 pages. (Official Copy only).
Ebihara, Toru, "Exploration of New Functions of Microsoft Windows", Nikkei Byte, Japan, Nikkei McGraw-Hill, Inc., pp. 117-134.
Office Action with English Translation from Application No. CN201180062779.4, dated Aug. 24, 2016, 20 ages.
Japanese Office Action with English Translation from JP Application No. 2013-540088, dated Apr. 4, 2017, 6 pages.

* cited by examiner

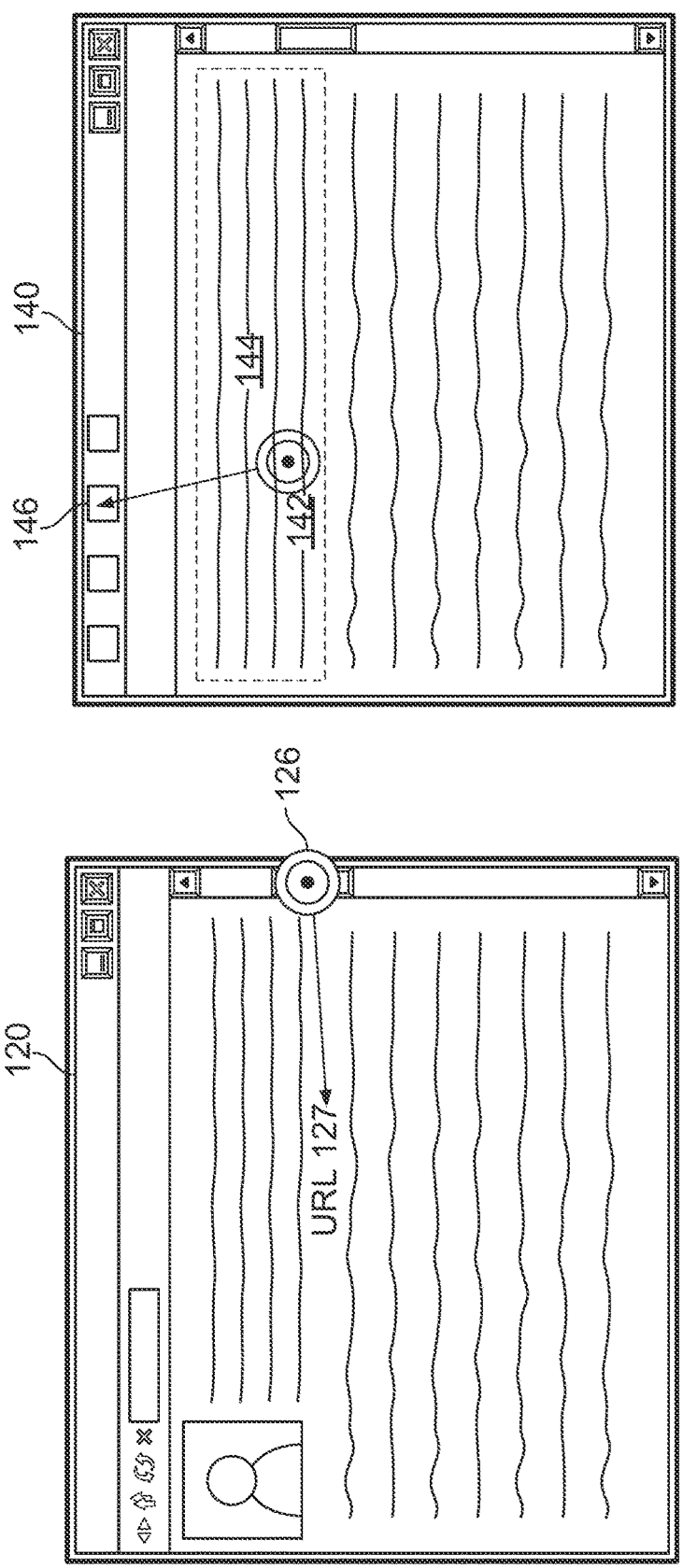

CONTROL OF DISPLAY OF CONTENT WITH DRAGGING INPUTS ON A TOUCH INPUT SURFACE

CROSS-REFERENCE TO RELATED APPLICATIONS

This application is a Continuation of, and claims priority to, U.S. patent application Ser. No. 13/300,401, filed on Nov. 18, 2011, entitled "Orthogonal Dragging on Scroll Bars", which, in turn, claims priority to U.S. Provisional Application No. 61/415,179, titled "User Interaction in a Computer Operating System", filed on Nov. 18, 2010, and U.S. Provisional Application No. 61/458,326, titled "User Interaction in a Computer Operating System," filed on Nov. 18, 2010, the disclosures of which are incorporated by reference herein in their entirety.

TECHNICAL FIELD

This document relates to systems and techniques for interacting with users of a computer operating system.

BACKGROUND

As computers become more present in normal daily activities, the manner in which users interact with computer becomes more important. For example, while early computers used punch cards for interaction with a limited group of users, desktop personal computers led to more prolonged interaction with more users, and to the development of graphical user interfaces. Such interfaces became part of the computer operating systems themselves, and were further extended by applications that ran on the operating systems.

Computing devices are now frequently portable and carried by a user, such as in the form of smart phones, netbooks, tablets, and similar devices. Because such device may be of a limited size that makes interaction via a keyboard less practical than for a desktop or laptop computer, alternative mechanisms for interaction may be provided, such as in the form of touch screen user interfaces that display graphical content and can also receive user inputs over that content. Other input mechanisms can also be used, such as voice input and gesture-based inputs that can be sensed by accelerometers or compasses in a mobile device.

SUMMARY

This document describes systems and techniques that may be used to interact with a user of a computing device, such as a mobile computing device (e.g., a smart phone). The various techniques described here can provide mechanisms for more intuitive user interaction with a device, including by signaling the user with the device and for responding to user inputs provided to the device. User feedback can take the form of audible signals, haptic feedback (e.g., coordinated vibrations of the device) and movement of on screen user interface elements.

For example, in certain implementations described below, a user may "surface" a new window (e.g., as a new application, a new instantiation of an application, or a new pane within a particular instantiation of an application) in a graphical user interface by dragging at the edge of an already-open window in the application. For example, a user can drag on a scroll bar at the edge of a canvas of an application such as a web browser or a word processor, in a direction that is orthogonal to a direction the user would normally drag to move the scrolling element in the scroll bar. Normally, such dragging would be an invalid input, but in the examples discussed below, such dragging may be interpreted by a computing system as a user intent to open a new window. Thus, in response to the input, the application or operating system may open the new window adjacent the existing window in the direction of the dragging vis-a-vis the existing window. The system may also resize the existing window—for example, if the existing window was maximized on a screen when the dragging occurred, then the existing window and the new window could each occupy half (left and right, or for vertical orthogonal dragging, top and bottom) of the screen.

In certain implementations, such systems and technique may provide one or more advantages. For example, user interaction with a computing device may be improved and users may be more likely to purchase more devices and recommend them to others. Also, authors of applications may benefit in being able to provide their applications using interfaces like those discussed here, and may also be able to generate new and additional kinds of applications.

In another implementation, a computer-implemented user interface method comprises displaying content in a first window on a display of a computing device; receiving a dragging user input on an element at a periphery of the window; and in response to receiving the dragging input, generating and displaying a second window on the display of the computing device and displaying the first window simultaneously with the second window. Displaying the first and second window can comprise automatically positioning the first window adjacent to and beside the second window, and the element at the periphery of the window can comprise a scroll bar and the dragging motion comprises a motion having a component in a direction at a right angle to normal scrolling motion of the scroll bar. Also, the dragging motion can comprise a selection on the scroll bar followed by motion into a body of a document that is being displayed in the first window.

In another implementation, a computer-implemented system for interaction with a user of a computing device is disclosed, and comprises a graphical user interface having a touch screen display; a dragging input sub-system to identify the occurrence of a contact with the touch screen display and a direction of dragging after the occurrence of a contact; and a processor operably connected to tangible computer memory that stores code to identify a dragging input on a first window at a perimeter of the first window and to create a second window in response to the identified dragging input.

In yet another implementation, a computer-implemented system for interaction with a user of a computing device is disclosed that comprises a graphical user interface having a touch screen display; a dragging input sub-system to identify the occurrence of a contact with the touch screen display and a direction of dragging after the occurrence of a contact; and means for generating a second window in response to a dragging input in the first window, and from an element at a periphery of the first window. One or more of these implementations advantageously allow a user to quickly and easily generate a second window. The newly-generated window may be advantageously displayed alongside the original window, therefore, not requiring the user to resize and move the two windows to be able to view both windows at the same. Some implementations also allow a user to indicate how to size the original and new windows relative to one another.

The details of one or more embodiments are set forth in the accompanying drawings and the description below. Other features and advantages will be apparent from the description and drawings, and from the claims.

DESCRIPTION OF DRAWINGS

FIGS. 2A, 2B, 2C, 2D, 2E, and 2F show screen shots of a technique for adding windows to a graphical user interface.

Like reference symbols in the various drawings indicate like elements.

DETAILED DESCRIPTION

This document describes systems and techniques for providing interaction with a user of a computing device, such as a mobile smart phone, using, for example, elements of an operating system that runs on the device. The system and techniques may provide various output mechanisms that can be implemented visually, audibly, or via touch, and input mechanisms for controlling the device. Multiple particular example techniques are described here, and the techniques can be implemented individually or together in coordination with each other and with other aspects of an operating system.

Figure 1B:
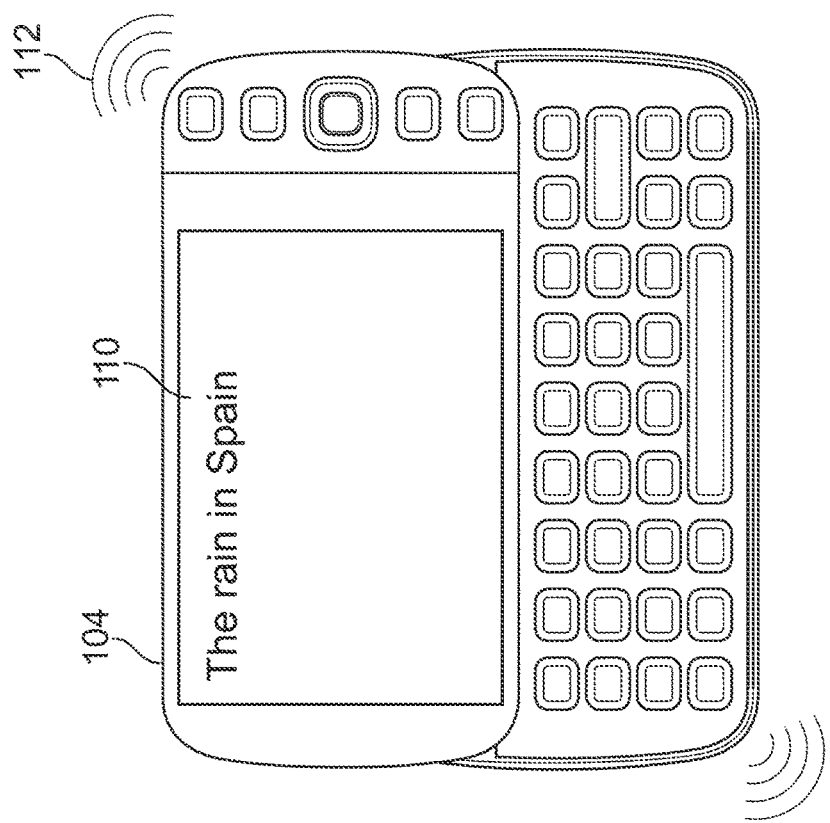
FIGS. 1A and 1B are diagrams showing haptic feedback in a mobile computing device.
Figure 1A:
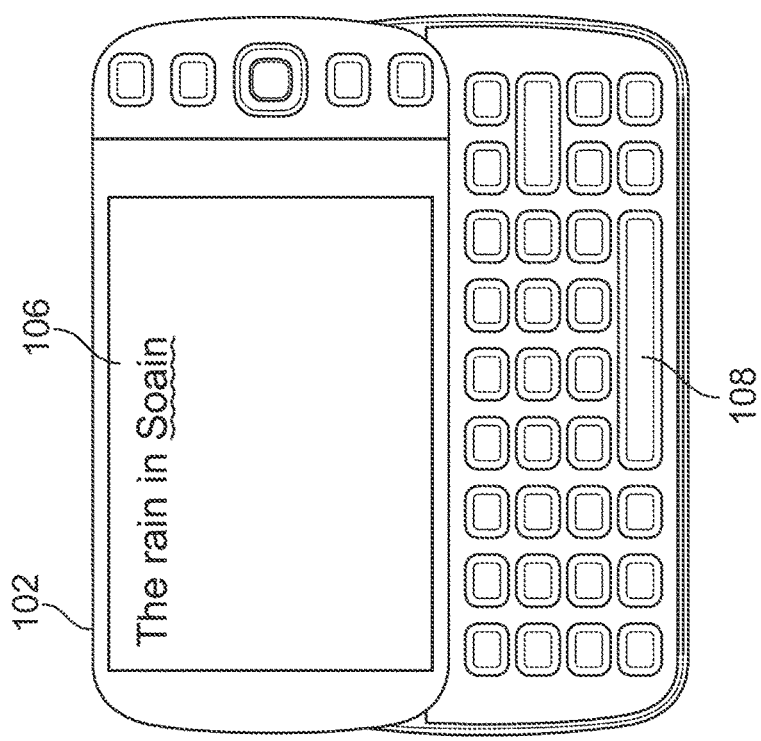

FIGS. 1A and 1B are diagrams showing haptic feedback in a mobile computing device 102. In general, the device 102 takes the form of a smart phone having a slide out keyboard 108. The device 102 also includes a graphical display on its front surface for displaying information to a user, where the display may include a touch screen input mechanism for obtaining input from a user, such as by the user touching the surface of the display with their finger or with a stylus.

In this example, the device 102 is shown in a first state, in FIG. 1A, and in a second, later state in FIG. 1B. In the first state, the device 102 is shown after the user has started typing a sentence into the device 102, such as to submit the text of the sentence as a search query, to add the text as a sentence to a word processing document or e-mail, or for other similar purposes. The phrase 106 that has been entered by the user includes a spelling error, in that the word Soain has been entered, but the user clearly intended to type the word Spain. In this example, a real-time spell checking system may determine that the word Soain does not appear in a dictionary that is stored on, or is otherwise accessible to (e.g., via a wireless network and the internet), the device 102, and may highlight the term such as by underlining it, in a manner like that performed by various spellchecking systems in existing word processor applications.

The identification of a misspelled word, in addition to triggering the system to correct the spelling of the word, may also cause the device 102 to provide haptic feedback to a user. For example, depending on the action that the system takes with respect to the misspelled word, one or more distinct types of haptic feedback may be provided. As one example, the device 102 may vibrate once over a relatively short period, such as for a fraction of a second, if the device has been able to locate a spelling correction for the term, such as term 110, where the word Spain has been identified and automatically placed into the string. Alternatively, if the system is unable to identify a correction to the term 106, the device 102 may be made to vibrate two times in close succession to each other.

The haptic feedback may thus trigger a user of the device to recognize that a problem has been recognized with the text that they entered so that they move their eyes to the screen, or provide additional focus on the screen. If the user feels a single vibration, they might look up to confirm that the replacement word is correct, whereas if they feel two vibrations, they might look up and stop their typing so as to figure out if a manual correction is needed.

The device 102 may provide other haptic feedback in other embodiments. For example, a small click may be provided or a low tone may be played that the user can feel in his or her hands. Also, patterns of haptic feedback other that a single vibration and a double vibration may be used. For example, the length, time-wise, of a haptic event may signal some status to the user, or the amplitude of the haptic event mat be used. As one example, a light vibration can indicate that a correction has been made and a user can probably ignore it, whereas a strong vibration can indicate that an error was identified but a correction could not be made, so that the user should pay more attention to the problem.

The haptic feedback can also be provided in response to voice input by a user. In such a situation, the system would not be looking for typing errors by the user, but instead, for situations in which the system has a low confidence that a word it has selected matches the word that the user spoke. Haptic feedback may be more helpful than audible feedback, because a user providing spoken input may not normally be looking at the screen to determine whether his or her words are being understood correctly, and audible feedback may be unnecessarily distracting to the user, as it can be hard to talk and listen at the same time. In contrast, haptic feedback would allow a user to hold his or her device, have it in a pocket or other similar location, and be notified about a problem with any speech-to-text conversion in a fairly non-invasive manner.

Figure 2B:
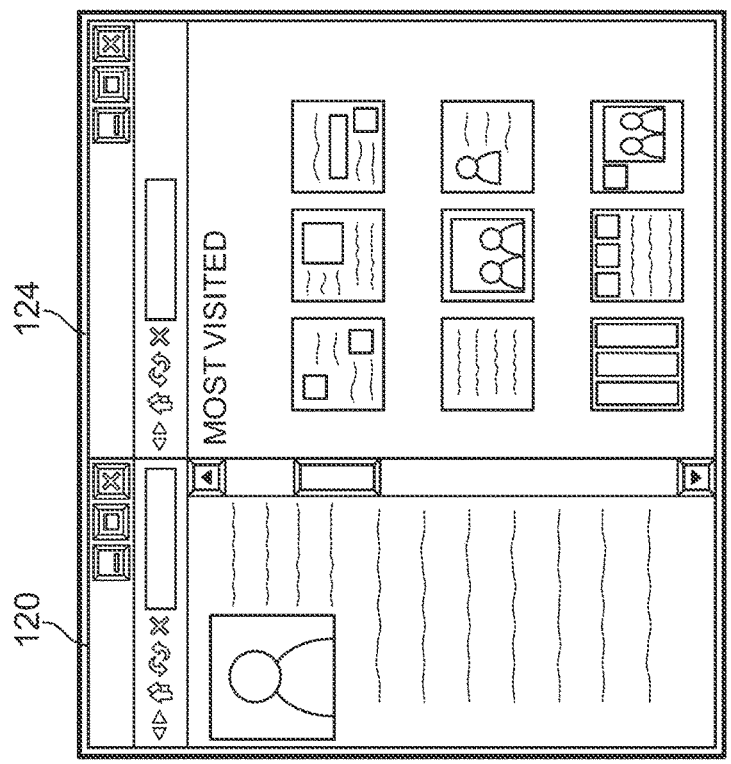
Figure 2A:
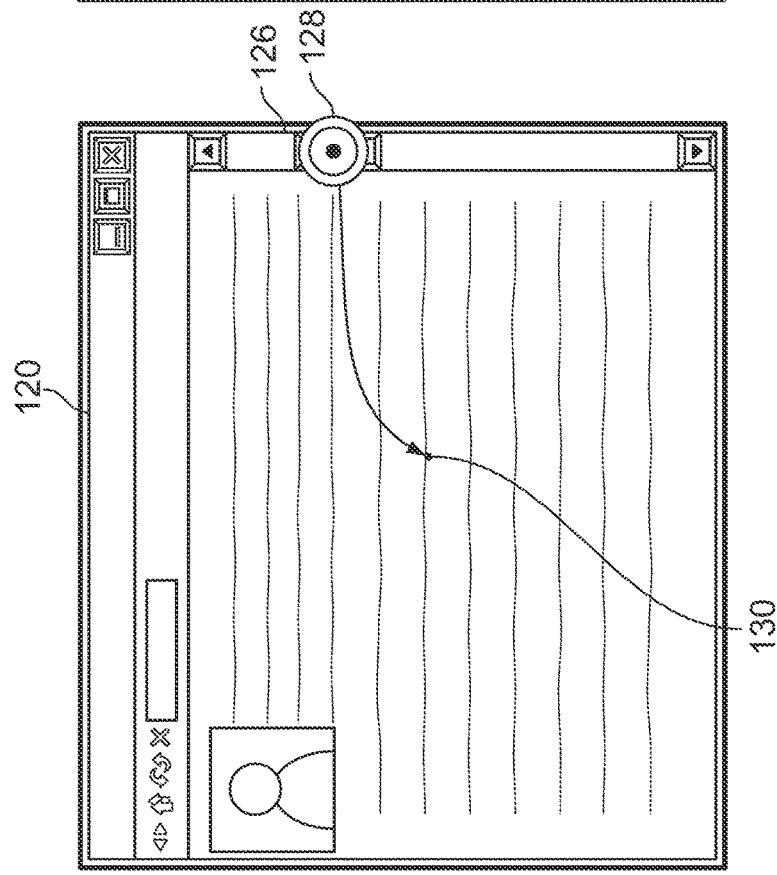

FIGS. 2A and 2B show screen shots of a technique for adding windows to a graphical user interface. In general, the technique here involves identifying a user-initiated dragging motion that starts around a periphery of a window in an operating system's graphical user interface (such as over a scroll bar), and moves into the window. Such a user motion is interpreted as an intent by the user to add a new window, so the system creates a new window stacked to the side of the original window, which the system shrinks in size to accommodate the new window.

Generally, the input is identified as having a "new window" intent for the user rather than a "scrolling" intent that is typically registered for a scroll bar, when the input is orthogonal to the normal input—i.e., dragging a scrolling element along a path of the scroll bar. Such an orthogonal input may be registered, for example, when the input is more orthogonal tan linear, i.e., more than 45 degrees off the line of motion of the scrolling element. In other situations, because scrolling is the ordinary intent, the range of angles for scrolling may larger, so that scrolling is interpreted to be the intent if the user starts dragging on top of the element and continues to maintain an angle with respect to the element that is 60 degrees or less, or 80 degrees or less, as compared to a line along which the element normally travels. Also, a space may be maintained between an angle at which scrolling will be presumed to be the user's intent and the angle at which creating a new window will be presumed to be the intent.

Alternatively, a distinction between the two user intents may be based on a lateral distance that a user has moved away from the scroll bar. For example, any motion within one inch or a certain number of pixels off the scroll bar may be interpreted as scrolling input (whether the dragging has moved above or below the scrolling element), whereas dragging beyond that point may be interpreted as input to open a new window.

In FIG. 2A, a window 120 is shown with a basic web browser running in the window 120, and a web page displayed in the browser. Suppose that the user reviewing the web page is studying about a person mentioned on the web page, that the user wants to find out additional information about the person, and that the user wants to review that information in parallel with the information on the web page. One useful way to make such a review would be to provide two windows on a display in a side-by-side or similar arrangement. Alternatively, the two windows could be displayed where one window is above the other window; the windows may also be directly adjacent. In some instances, the two windows would automatically be displayed at the same size (e.g., each at half-screen). Alternatively, the new window 124 may be displayed larger or smaller than is the original window 120. In some embodiments, the user may indicate how to size the windows.

A convenient mechanism by which to establish such an arrangement is shown by selection target 128, which represents the pressing by the user over a scroll bar at a right edge of the display area of the browser. An arrow in the figure from selection target 128 to drop target 130 represents a dragging motion between those two points by the user before the user lifts his or her finger (e.g., from a mouse button or a touch screen) at drop target 130. The selection target 128 can be located over a scrolling control 126 on the scroll bar or at another location on the scroll bar. The selection could also be on another peripheral element near the edge of the window 120 that is outside the display area for the browser in which web page content is displayed. Alternatively, the selection target 128 can be a location within a small distance of the periphery of the window 120, regardless of whether there is a visible element there.

The drop target 130 may be at a location that is located away from the selection target 128 and generally orthogonal from the selection target. The drop target 130 may be identified as a point at which the user raises his or her finger after dragging, or a point that is a determined lateral distance away from the scroll bar, and that registers a user intent when it is reached, even if the user maintains his or her finger in contact with a touchscreen. (In such a situation, a user could preview a split window may dragging past the determined distance, and may un-do the split screen and return to the original display by dragging back toward the scroll bar within the determined distance. For example, the user may drag over to view the extra content that interests them, review the content while holding their finger on the display, and then have the content removed and be returned to their initial browsing by dragging back toward the scroll bar. Such an interaction could also occur by a user pressing on a hyperlink on a page, dragging the hyperlink off the page to have a new window opened that displays the content at the target of the hyperlink (and optionally shrinks the existing page for side-by-side viewing with the original page), and then dragging back onto the original page, which final dragging causes the computing system to close the window for the hyperlinked content and return the display to the way it looked before the user slid the hyperlink off the original window.

Alternatively, the initial motion by the user may be generally orthogonal to the scrolling motion of the scroll bar, but the drop target may be located at a point near the periphery of the window 120, along a side of the window that is adjacent to the side of the window near where the selection target 128 is located (e.g., along the bottom of the window). This motion may demonstrate an intent by the user to size the new window by a vertical line drawn up from the location of the drop target. FIG. 2B shows the original and new windows. In some implementations, the windows have been sized to the release point of the user's dragging motion, which, in the example case, would have been located along the bottom of the window along the vertical defined by the new location of the scroll bar. The new window in this example is not shown as having a scroll bar, though if it had content that could not fit on the displayed area, it would normally be shown with a scroll bar. Also, the new window here shows thumbnails of the most-recently-visited pages for the user, much like the GOOGLE CHROME BROWSER shows thumbnails when a user opens a new pane in the browser (where a pane would be considered to be a new window as described here).

In some embodiments, a new window is instantiated by the user pressing down (e.g., on a mouse button or on a touch screen) on a scroll bar and dragging in a direction generally orthogonal to the direction of the scroll bar (and potentially only after the user reaches a determined distance away from the scroll bar). For example, if the scroll bar permits a user to scroll up and down, pressing down on the scroll bar and dragging generally to the left (if the scroll bar is located on the right side of the window) or generally to the right (if the scroll bar is located on the left side of the window) and lifting his or her finger after dragging a predetermined distance or predetermined time causes a new window to be instantiated. (Dragging off the window, i.e., in the opposite direction as the examples in the prior sentence, can also achieve the same results.)

Similarly, if a window has a scroll bar along the top or bottom that permits a user to scroll left and right, pressing down on the scroll bar and dragging generally up (if the scroll bar is located along the bottom of the window) or generally down (if the scroll bar is located along the top of the window) and lifting his or her finger after a predetermined distance or predetermined time causes a new window to be instantiated. The motion caused by the user may not necessarily be precisely orthogonal or at a right angle to the direction of the scroll bar, as such precision cannot be expected of a user. However, the mechanism may accept a user motion that is within 30 degrees of an orthogonal direction. In a more sensitive embodiment, the mechanism may accept a user motion that is within 20 degrees of an orthogonal direction. The user motion should be distinguishable from a scrolling motion. Where the user does not indicate how the original and new windows should be sized, in some embodiments, the windows are defaulted to be equally sized.

A predetermined distance may be defined by the required distance between the selection target 128 and the drop target 130. A predetermined distance may be defined in relation to the size of the window, as defined by its height and/or width. For example, the mechanism may require a user to press and drag at least half the length of the window (if the dragging motion is made vertically) or half the width of the window (if the dragging motion is made horizontally). In other embodiments, the mechanism may require dragging one-third of the width or length. In other embodiments, the mechanism may request dragging more than one-half of the width or length of the window, such as, for example, two-thirds or three-fourths of the width or length.

Alternatively, a predetermined time may be defined, where the user presses down and releases after a predetermined amount of time to instantiate a new window. The predetermined time may be at least 0.5 second. In another embodiment, the predetermined time may be at least one second. In yet another embodiment, the predetermined time may be at least two seconds. In some embodiments, if a user presses down and drags in a direction that could instantiate a new window but does not release after a time limit, no window is instantiated when the user lifts his or her finger. For example, if the user presses down and does not release his or her finger after more than two or three seconds have passed, no window is instantiated when the user lifts his or her finger.

Referring again to FIG. 2B, it shows the result of the computing device's interpretation of such inputs by the user. In particular, the window 120 is shown, and a new window 124 is also shown adjacent to the original window 120. The window 120 has been contracted downward in the lateral dimension to the same extent that the user dragged in FIG. 2A, i.e., the right edge of the window 120 in FIG. 2B is approximately in line, vertically, with drop target 130. Also, a new window 124 has been instantiated automatically in response to the user input shown in FIG. 2A. The window 124 can be a standard, generic opening page for a browser, such as a page that displays a search box, a page that displays thumbnails of several of the most-visited sites for the user, or other such content.

Figure 2D:
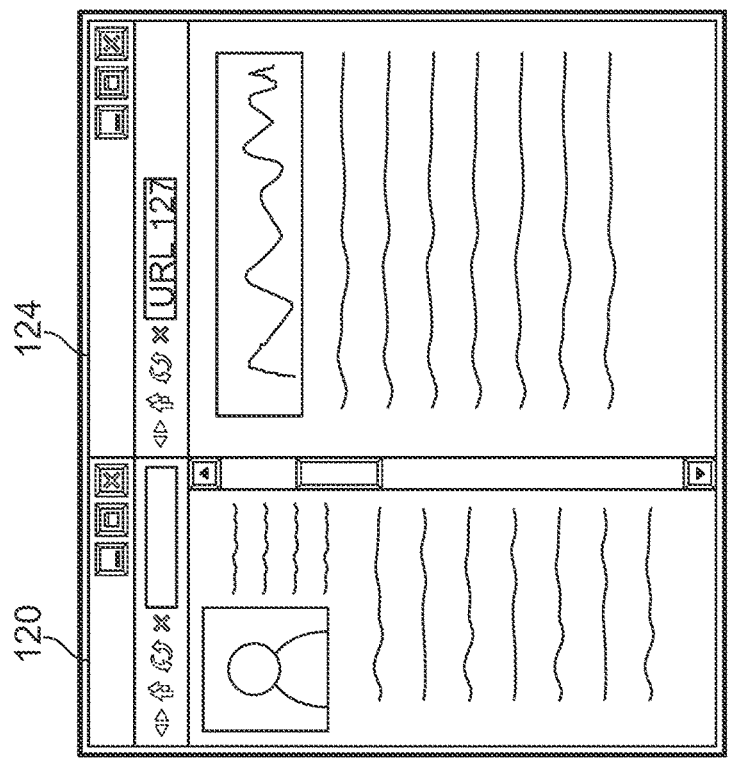
Figure 2C:
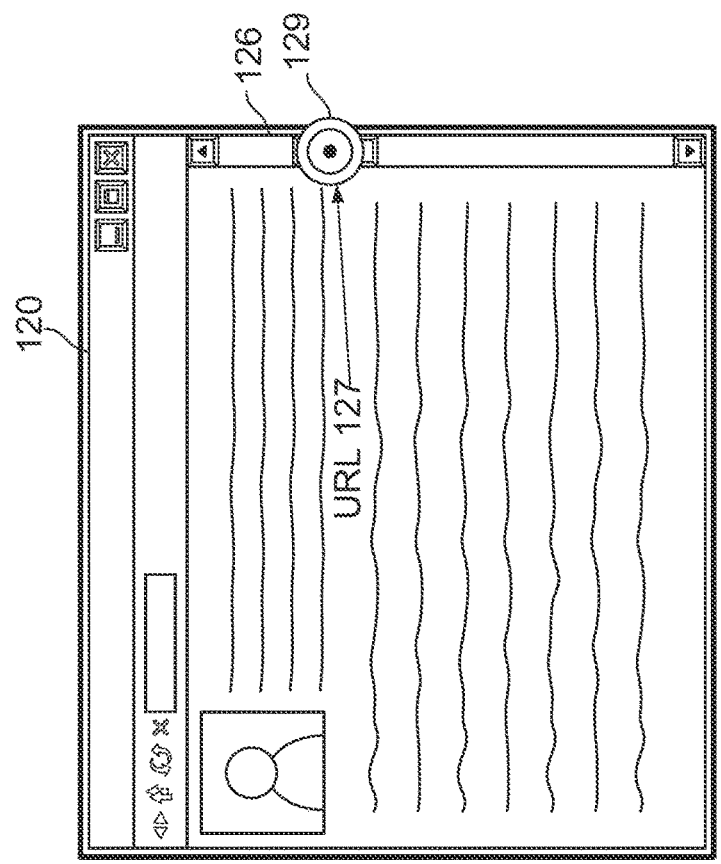

Also, the input from the user in FIG. 2C may indicate what page is to be displayed in window 124 when it is instantiated. For example, the selection target may be on an element on a web page, such as a URL 127 (where the drop target 129 is an edge of the screen or an area outside the pane or tab that is currently the focus of the browser), and the web page for that URL may be opened in window 124 as shown in FIG. 2D. Referring to FIG. 2E, in an alternative embodiment, a user may indicate what page is to be displayed in window 124 when it is instantiated where an element on a web page, such as a URL, is the drop target 129. In such an embodiment, the selection target may be a peripheral element near the edge of the window 120 that is outside the display area for the browser in which web page content is displayed. For example, the selection target may be a scroll bar or a scrolling control 126 in a scroll bar. The user motion may comprise a motion from the scroll control 126 (the selection target) to the web page element, or URL 127 (the drop target), as shown by the arrow in FIG. 2E. As discussed above, a user may also easily "undo" the opening of a new window 124 in such a situation, such as after the user has reviewed the content on the new page, by dragging back onto the original window 120.

Although the example here focuses on web browsers and web pages, the techniques may be used with other applications. For example, a user of a word processing application may make a similar dragging motion and have a new document opened in a new window or pane. The new document may be established as a subdocument, along with the original document, of a larger document that contains both subdocuments. For example, such dragging may be used to open a new chapter in a manuscript for a book, where a document for the entire book contains sub-documents for each chapter. As another example, referring to FIG. 2F, a user may highlight a selection 144 from a document in a word processing document. A user may then make a dragging motion to or from the highlighted selection to a periphery of the window of the word processing document (and off the canvas of the document, which may be a sub-window within the main window that defines the instantiation of the application) in order to instantiate a second window. In the example shown in FIG. 2F, a user clicks on a selection target 142 located within the highlighted selection 144 and makes a dragging motion to a peripheral element 146 that is a drop target. The second window would be displayed and generated having the highlighted selection pasted into a new word processing document displayed in the second window.

Figures 3A, 3B:
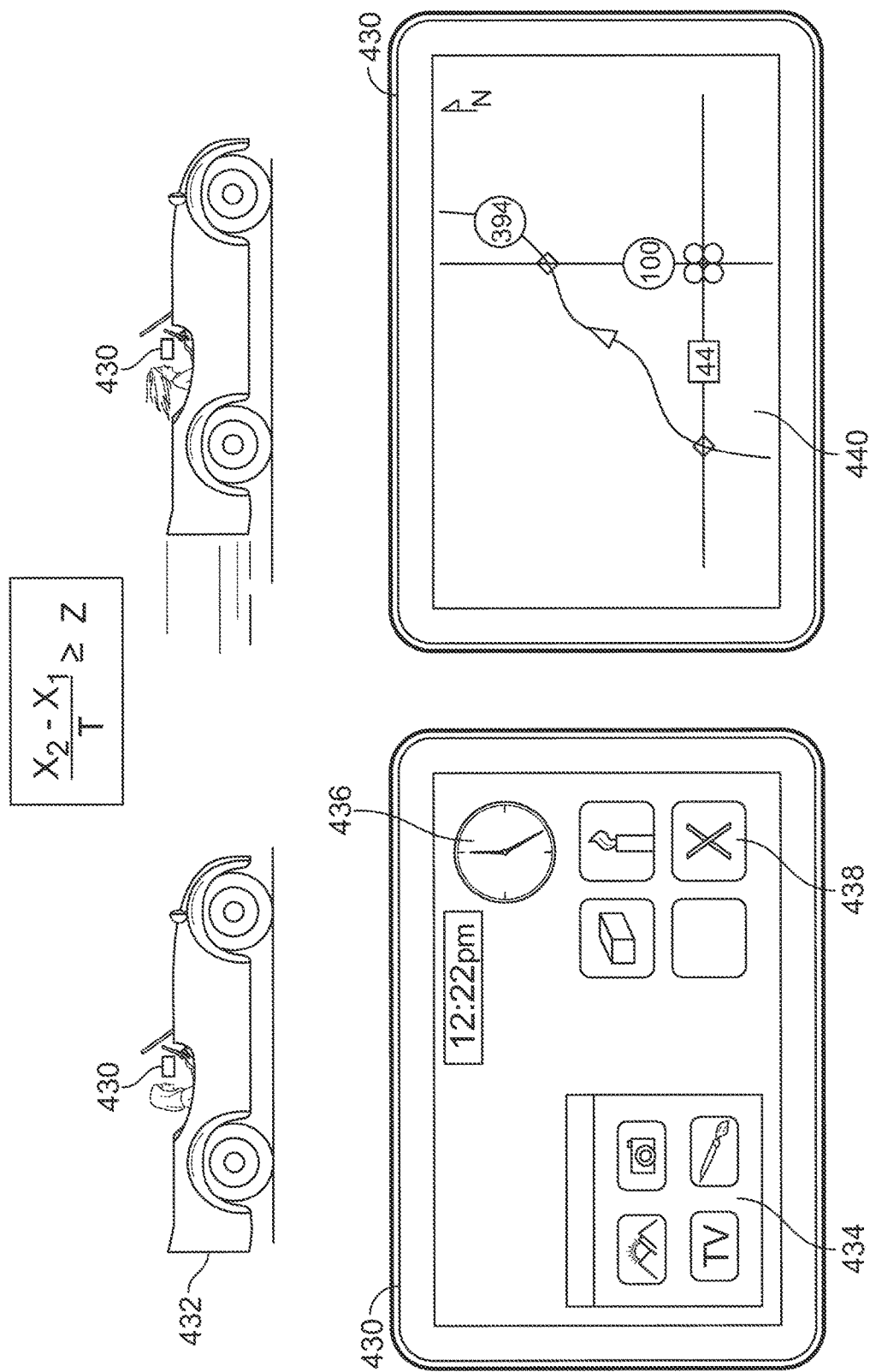
FIGS. 3A and 3B show conceptually the activation of a mapping application on a mobile computing device in response to motion of the device.

FIGS. 3A and 3B show conceptually the activation of a mapping application on a mobile computing device 430 in response to motion of the device 430. FIG. 3A shows the device 430 in a standing automobile 432 along with a screen shot of the device 430, while FIG. 38 shows same automobile 432 moving, along with a screen shot of the device 430, so as to highlight an example mode of operation for the device 430.

In FIG. 3A, the device 430 is mounted to the automobile 432, such as by being placed in a dock on the dash of the automobile 432. The automobile 432 is not moving, and the device 430 simply displays a desktop for an operating system on the device 430. For example, the device may display one or more icons 438 whose selection may cause various applications on the device 430 to launch, and groups 434 of icons. In addition, widgets or gadgets may be displayed on the desktop, such as a clock 436 or other such program. Thus, the display on device 430 is provided in a familiar manner.

In FIG. 3B the driver of the automobile 432 has started moving, and a GPS module in the device 430 may, as a result, compute a speed for the device 430, and in turn, for the automobile 432. Such a determination may be made according to an equation like that shown between the stationary and moving representations of the automobile 432, by determining a distance between two points over a time period, and dividing by the time period in order to obtain a rate of travel.

The device 430 in this example with a program that compares that computed speed to a predetermined speed, and when the predetermined speed is met or exceeded, the device 430 changes its display from the desktop display to a navigational display 440 in the form of a map that show the position of the device 430 and automobile 432 on the map. In this manner, the device can change modes automatically based on an inference that the moving user will want to have information about their up-to-date location.

Although the display 440 here is shown as providing only a navigational display, other information could be maintained on the display. For example, a strip along the periphery of the display may be reserved for displaying incoming messages (e.g., caller ID information for incoming telephone calls, subjects lines from incoming emails, and the like) and the user may select an area on a message alert to have more information about the corresponding message displayed over the navigational display, or may have it replace the navigational display. Also, when a particular event occurs, such as an incoming telephone call, the navigational display may be pushed to the side in a split screen, or may be removed entirely, while the user takes the call.

The type of navigational display shown to a user may also depend on the speed detected by the device 430. For example, at low speeds, the device 430 may infer that the user is walking or riding a bike, and may show a map with detail that is appropriate to such activity, such as local stores, bus stops, and ATMs. At higher speeds, the display may instead show information relevant to the driver of an automobile, such as filling stations, driving directions, and current traffic information. Certain information may be shown in both modes, such as the locations of coffee shops.

The zoom level of the navigational display may also change automatically in response to changes in speed of the device 430. For example, if the speed is under ten miles per hour so as to indicate that the user is on foot, the zoom level may be set so that the device 430 shows one or two blocks. If the speed is around sixty miles per hour, the zoom level may be reset automatically so that the device 130 shows several miles of range.

In the manners shown here, then, a navigational display may be made the focus of a device in response to sensed motion of the device, so that a user need not explicitly request such a display. Also, the particular mode of the navigational display may change, depending on the speed that the device is moving.

Figure 4B:
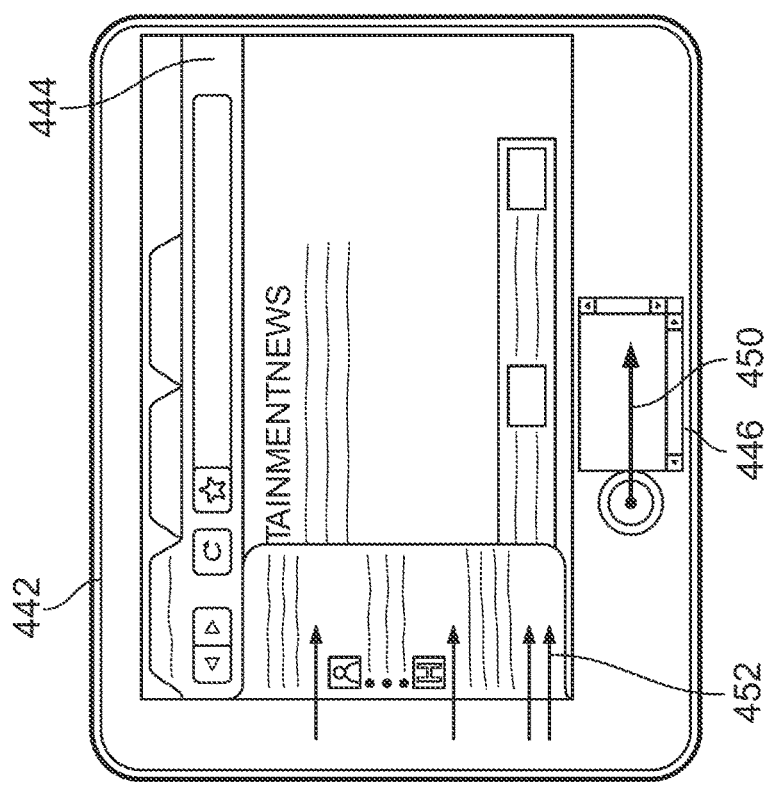
FIGS. 4A and 4B show screen shots of a computing device having a touch pad input mechanism and on-screen elements responsive to particular gestures on the touch pad input mechanism.
Figure 4A:
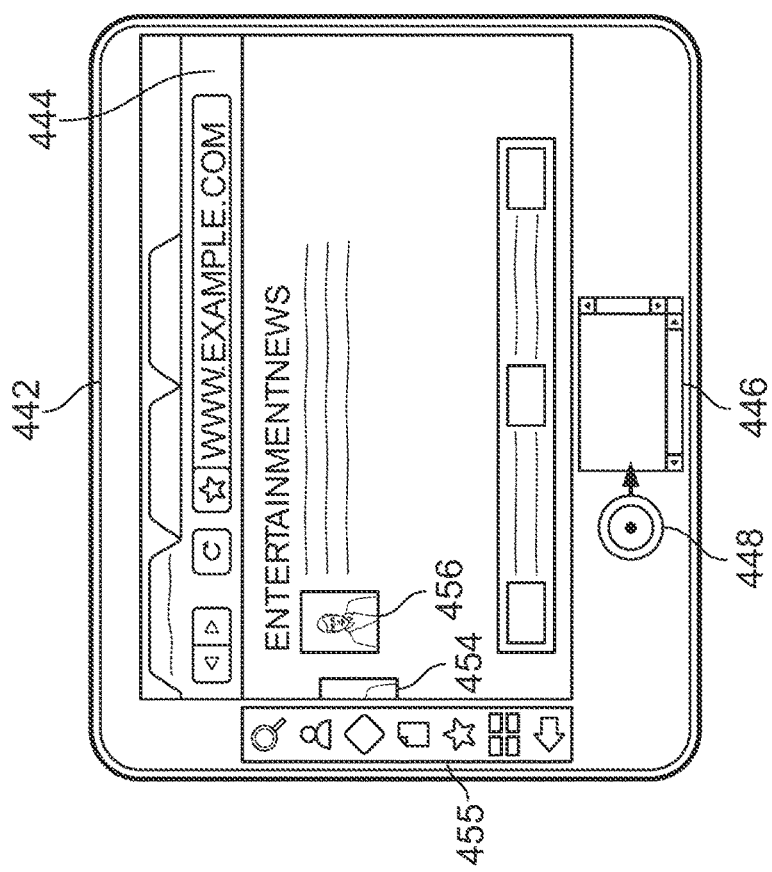

FIGS. 4A and 4B show screen shots of a computing device 442 having a touch pad input mechanism and on-screen elements responsive to particular gestures on the touch pad input mechanism. In this example, the device 442 is in the form of a notepad having a touch pad adjacent the touch screen, but would normally be in the form of a netbook or laptop that has two elements connected by a hinge, with a graphical display in one of the elements, and a keyboard with touch pad (and corresponding selection buttons) on the other element.

In FIG. 4A, the device 442 is shown displaying a web page 456 on a graphical display 444. A selectable tab 454 is shown at the left edge of the display 444. The arrow on the tab 454 indicates to a user of the de vice 442 that they can select the tab 454, such as with a pointer operating by the touch pad or a mouse, and may drag it to the right so as to drag onto the screen one or more objects that are currently (though merely by inference) located off the left side of the display 144.

Alternatively, and as shown by contact point 448, a user may indicate an intent to pull an object onto the display 444 from an area to the left of the display by contacting the device 442 to the left of touch pad 446 and then dragging their finger onto the surface of the touch pad 446 and a sufficient distance into the surface to register such an intent. Although the user's finger will not be sensed off the edge of the touchpad, its first presence right at the edge of touchpad 446 can be sense, along with its vectoring at a right angle to the left edge, in a direction onto the touchpad surface. As shown in FIG. 4B, the input form the user to point 450 on the touchpad 446 causes an information panel 452 to be animated so as to slide across the display 444 in coordination with movement of the user's finger on the touchpad. A corresponding swipe, either from off the right edge of the touchpad 446 and onto its surface, or from an area on the touchpad 446 and off the left edge of the touchpad generally in a horizontal and straight swipe, may indicate an intent to remove the information panel 452 from the display 444 so that the device 442 returns to the look of FIG. 4A.

In this implementation of user inputs, it does not matter whether, when the user swipes their finger on the touchpad 446, the corresponding point on the display 444 would be over the tab (in this situation, at the center of the display 444). Instead, the instance of the motion starting off the touchpad 146 is taken by the device as indicating that the tab 454 be grabbed by the motion, regardless of the vertical location of the finger vis-a-vis the touchpad 446.

The particular location of the point 450 may or may not affect the reaction of the device 442 to the user input. For example, the point 450 may be required to extend far enough into the touchpad 446 to at least indicate that the user is providing a horizontal input across the touchpad 446. The ultimate location of point 450 may also control how far panel 452 slides onto the display 444. For example, the panel 452 may have two vertical columns of information, and one vertical column may be displayed if the user drags less than halfway across the touchpad 146 (or some other distance), while both columns may be displayed if the user drags farther.

A touch bar 455 is also shown along a left edge of the display 444. The touch bar may be off of the graphical display portion of the device 442, on a bezel of the device 442, and may be a touch sensitive device having a relatively low resolution. As shown, in an appropriate circumstance, the touch bar 455 may have a plurality of zones that are each directed to a web browsing operation, such as showing bookmarks, going to a home page, and moving forward or backward. The areas may each be sized so that a user can easily press their thumb against the relevant selection while pinching their forefinger behind the bezel. The area of the touchbar 455 may also include functionality to identify limited motion by a user, such as a motion dragging their thumb from on top of an icon on the touch bar 455, off the edge of the touch bar 455. Such motions may be assigned to particular functions, and may also or alternatively be programmable by applications running on the device 442.

Thus, using the touch bar 455 in a bezel of the device 442, a user may be provided with additional quick-input mechanisms, but without having to add keys to a keyboard. Also, various other techniques for receiving and interpreting bezel inputs may be used. For example, the bezel selections may include icons for controlling a music player, and the touch bar 455 may wrap around the device 442, so that some of its buttons (e.g., for web browsing or something else that would occur with a laptop top open) are visible from the inside of a device 442, and its other buttons are visible from outside the device when it is closed (e.g., music player controls that may be accessed without fully powering up the device 442).

Figure 5:
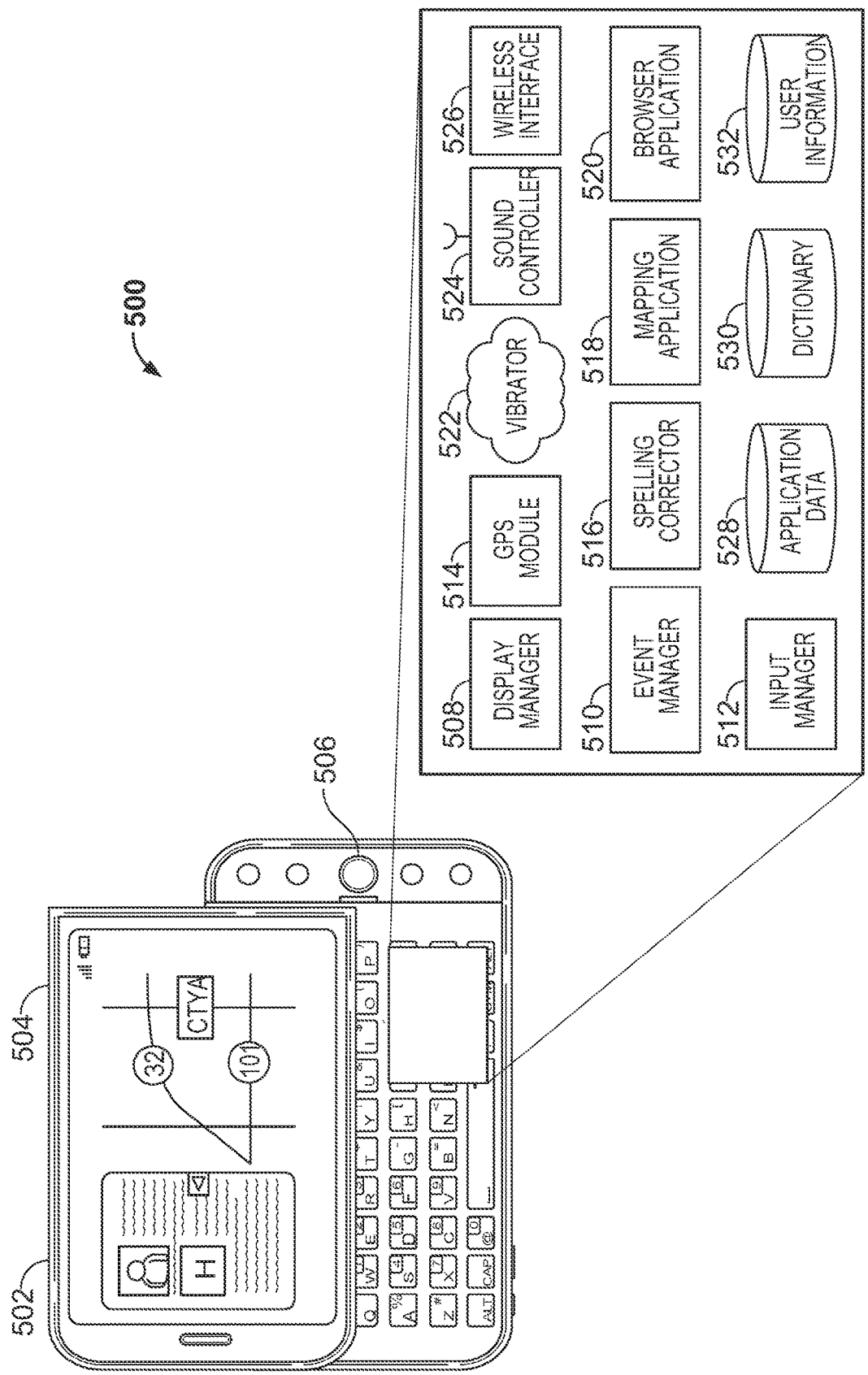
FIG. 5 is a schematic diagram of a mobile computing device.

FIG. 5 is a schematic diagram of a mobile computing device, for performing the techniques described above and below. The device is shown here in the form of a smart phone, but may take various other forms, such as a desktop personal computer, a netbook, or a laptop computer. In this example, the mobile device 502 is a slider-based smart phone having a touch screen display 504 for input and output and a trackball 506 as an alternative input mechanism.

The display 504 shows an example of a mapping application being displayed in a chrome-free browser in a manner like the pages above, and also an information panel to the left of the display 504 and extending inward form the left edge of the display, like that discussed above. The particular browser may also be shown with scroll bars or other navigational elements for the user interface, and input on such elements may be handled by the structural components that are described below in manners like those discussed above and below.

A number of components are shown schematically inside the device 502 to indicate components in the device that are associated with the features, and used to implement the techniques, discussed in more detail above and below. One or more of the components may be implemented as being stored in memory on the device and operated on a programmable microprocessor on the device 502, though the particular components are shown separately in this example for clarity of explanation. Other components and arrangements of components are also contemplated.

The device 502 includes a display manager 508 to control various elements to be shown to a user on the touch-screen display 504, while an input manager 512 manages inputs received from the touch-screen on the display 504 or other mechanisms such as trackball 506. The display manager 508 may receive information from various applications and from other components of the operating system, and may determine what elements to display in relation to other elements on the display 504, which elements to hide, and how to show visible elements in relation to each other.

The input manager 512 may coordinate with the display manager 508 so as interpret actions that a user takes with the device. For example, a user may place their finger on the touch screen display 504 or may move a pointer on the touch screen display 504 and then make a selection. The input manager 512 may refer to the display manager 508 to determine what item the user selected by such an action, and may generate an event that may be reported to various other components that may be subscribing to such an event, such as by using event manager 510. For example, the input manager 512 may identify that a user contact has occurred over a location where a scrolling element is displayed on the device 500, and may then identify that dragging has occurred in direction off the path for the element, in a direction that is orthogonal to the scroll bar. The input manager 512 may then notify another element that causes the device to respond to such input by opening a new window, as described above and below.

The device 502 may also be provided with various services that may be made available to applications running on the device and/or to the operating system of the device. For example, a GPS module 514, which may be a common commercially-obtained module, may make determinations about a location of the device 504 and may provide such information to various applications, such as applications that provide driving directions, that provide the user's location for reference by friends of the user through a social network, and the like. In a similar manner, a spelling corrector 516 may provide a service that is generally available to various applications running on the device, so that those applications can correct data that the user has input or otherwise notify the user about problems with the input. Such notification may be via haptic feedback, like that discussed with respect to FIGS. 1A and 1B above, and FIG. 3A below.

Various physical output mechanisms may also be provided in the device 502. For example, a vibrator 522 may be provided to give haptic feedback to a user. The vibrator 522 may have an associated controller (not shown) that can be called by various applications or services on the device. For example, the spelling corrector 516 may cause the device 504 to vibrate whenever a spelling error is identified by the spelling corrector 516. Also, a sound controller 524 and related audio speaker may be provided to give a user additional feedback, such as in the form of tones or synthesized speech.

Various applications such as applications 518, 520 may run on the device and may provide data for graphics to be displayed through the display manager 508. The applications may be part of an operating system on the device 502, or may be added by a user of the device 502, such as from an on-line marketplace. In this example, a first application is a mapping application 518 and may run as a standalone application or an application or plug-in that runs in browser application 520. The browser application 520 may be a standalone application or a component that is built into an operating system that runs on the device 502, and may generate displays like those described in detail elsewhere in this document. Other applications may also be provided or installed on the device 502, including by a user of the device 502.

Various messages for the operating system and the applications 518, 520, may be received over a network such as a wireless communications network connected to the internet, via a wireless interface 526. Information received from the network, such as from one or more remote servers, may be provided to the applications 518, 520, and information may be passed from the applications 518, 520 back to the network.

In addition, various forms of storage, including volatile storage and persistent storage, may be provided on the device 502. The persistent storage may include various data stores, such as application data 528, dictionary data 530, and user information 532. The dictionary data 530, as described above, coordinates with and is used by the spelling corrector 516, to provide information that permits the spelling corrector 516 to determine whether terms entered by a user are properly spelled. The application data 528 may include whatever data the various applications 518, 520, require in order to perform their functions. Depending on the application, more or less data may be stored locally on the device 502 as opposed to being stored on a remote server system. For example, certain devices may store data for a mapping application locally, whereas others may obtain mapping data (e.g., map tiles that show images of a portion of a geographic area) from a remote server as a user navigates on a map, and may dump the data soon after.

The user information 532 may include specific information about one or more users of the computing device 502. For example, the user information may include profile information for the user, as well as settings information that controls the interaction of the device 502 with the user, and that can also control the manner in which various applications operate on the device 502. Although three various data stores are shown here for clarity, much other information would be and can be stored on device 502, and need not be arranged as shown here.

Figure 6:
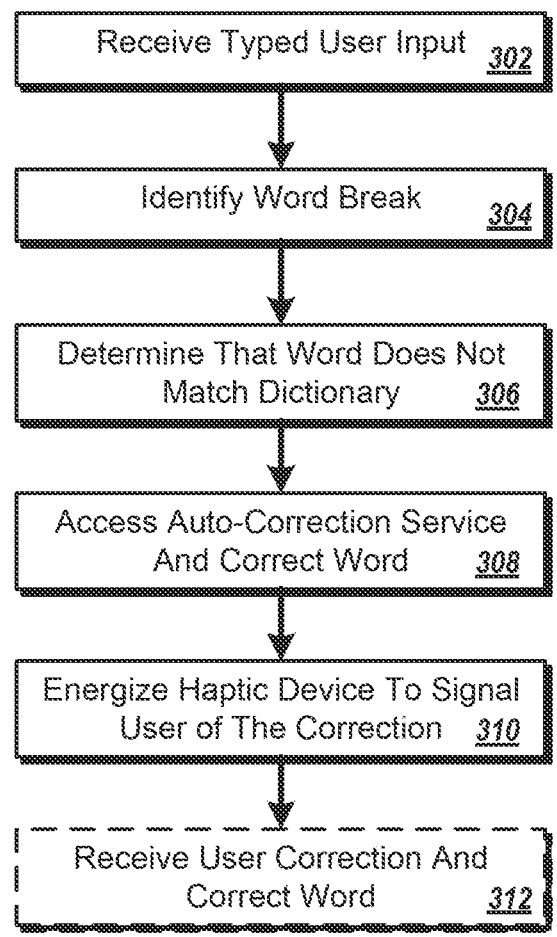
FIG. 6 is a flow chart of a process for providing haptic feedback in coordination with correcting user entry of data on a computing device.

FIG. 6 is a flow chart of a process for providing haptic feedback in coordination with correcting user data entry on a computing device. In general, the process involves automatically shaking or vibrating a mobile device in order to indicate to a user that a successful or an unsuccessful change (on non-change) has been made to information being input by the user.

The process begins at box 302, where a computing device receives a typed user input. Such an input may occur through one or more applications running on the device, such a word processing application, e-mail application, web browser applications, and other similar applications. The input may also be spoken input that is converted to text for the application, such as by a speech-to-text convertor. At box 304, the process identifies a word break in the input text, such as a space entered by a user, or the end of a word as determined by the speech-to-text converter. At box 306, a spelling correction application analyzes the entered word, or a phrase made up of multiple words, and determines that the word does not match any word in a dictionary that is stored on the device, or made accessible by the device. Such a determination may be made simply by comparing a word to a list of words in a dictionary or by comparing word in context to better determine the proper spelling of the word.

At box 308, the process accesses an auto-correction service to correct the word. Such a service may be implemented in a variety of familiar forms, so as to use dictionary data to determine a proper word spelling, or to determine what word a speaking user spoke.

At box 310, the process energizes a haptic device to signal to a user correction of the word. Such signaling may involve energizing the haptic device so that the user lightly feels vibration. After using the device for awhile, the user will inherently understand that the vibration indicates a correction to data being entered on the device. A stronger vibration, or two instances of vibration in close succession, may be used to indicate that the device could not correct the spelling of the term, or could not recognize the term spoken to the device. Other similar haptic feedback mechanisms may also be provided in response to identifying errors in user input, either when the errors in the text correct automatically or when they correct automatically, with a less intrusive signal when corrections can be made automatically, and a more serious signal when they cannot be corrected properly or a word cannot be determined. In the latter case, the more serious signal may cause the user to stop what they are doing and pay more attention to the device to make a manual correction of their input.

Box 312 shows such a user's manual correction of a word. The box is shown in dashed format because a user need not make such a correction, and can ignore their device, even when the haptic feedback indicating device could not make the correction automatically, such as when the user does not want to stop their input at the current time, and intends to make corrections after they finish entering data.

In this manner, a computing device may conveniently provide input back to a user who is entering data to the device. The alerting mechanism may be low key, in that it may be provided so as not to interrupt the user is entering the information, and the user need not stop the entry of information to be so notified. The user may thus continuing entering information if they choose, or to address a problem in their entry of information if they choose.

Figure 7:
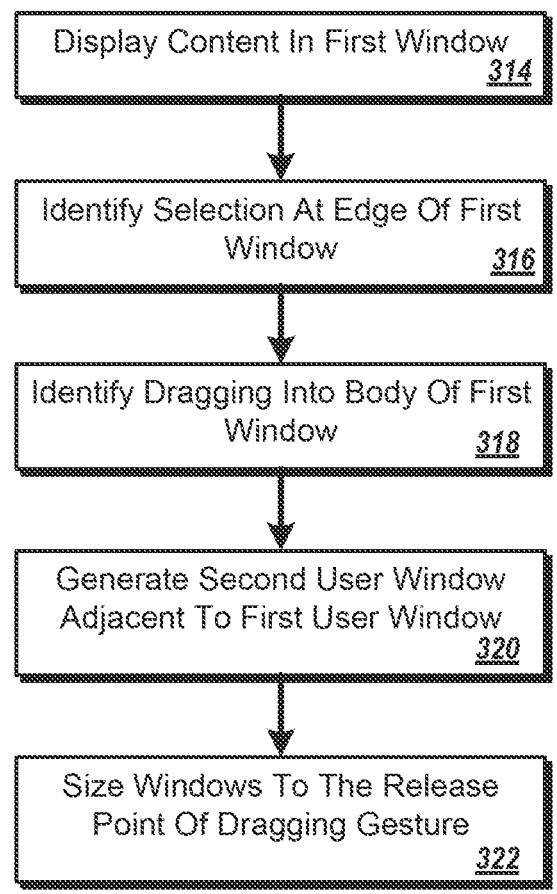
FIG. 7 is a flow chart of a process for generating display elements in response to user inputs on a window periphery.

FIG. 7 is a flow chart of a process for generating display elements in response to user inputs on a window periphery. In general, the process involves opening a new window or similar on-screen elements on a graphical user interface in response to a user selection near a periphery of the window that is already displayed on the interface. A user selection may begin at a periphery of a window and slide the interior portion of window, essentially indicating a user intent to slide one side of the window to the side, and also to provide a new window in the area vacated by the first open window. In this document, the term window is used to identify a graphical on-screen element that is set off from elements around it by a border and where selections inside the border represent user actions with respect to a particular application.

The process begins at box 314, where content is displayed in a first window in a graphical user interface. The content may be a web page in a web browser, a document in a word processing application, or of another similar form. In certain instances, a scroll bar may be displayed in a familiar manner along one side of the content, or along the top or bottom of the content, to permit accelerated movement through the content. At box 316, the process identifies a selection at an edge of the first window, such as in an area where a scroll bar is displayed. The selection may occur in a particular area of the scroll bar, such as where a scroll button is displayed in the scroll bar. At box 318, process identifies a dragging into a body of the first window. In particular, the process may determine that a user has first selected along a periphery of the window, such as along a periphery of the graphical display itself, and has dragged inward into a body of a document, such as by a horizontal dragging from left to right or right to left.

In response to identification of such dragging, the process at box 320 may generate a second user window adjacent to the first user window. Such generation of a second window may occur after the process has contracted the first window to make room on the display or the second window. Such generation of a second window may also await a user release of a pointer button, so that the user can initially slide inward and see outlined images of the windows displayed while they move so that they can see the future size of the two windows as they move.

A contraction of the first window, and the positioning of the second window, may be placed in a variety of locations, and one such location may be at a point at which the user releases their selection button after starting their dragging motion at a periphery of the window. For example, if a first window fills the entire display, and a user drags from a right hand scroll bar of the window halfway across the display to the left, the first window may fill the left half of the display after such an operation, and the new window may fill a right half of the display, as shown at box 322.

The information shown in the new window may take a variety of forms. For example, a blank document may be initially displayed in the second window, such as a blank word processing document or a generic first screen for a web browser, which shows a number of prior websites the user has visited or a search box in which the user may enter one or more search query. The new window may alternatively display information related to what is being displayed in the first window, such as a target of a web page link. In such a manner, a user may click on a link on a first page and drag to the periphery of the page or into an area out of the window, and order to open a new window that automatically displays the target of the link. Alternatively, the user motion may start at a periphery of the window and drag to a link on a page in order to open the target of the link in a new window (which may be a tab in a tabbed browser).

Figure 8:
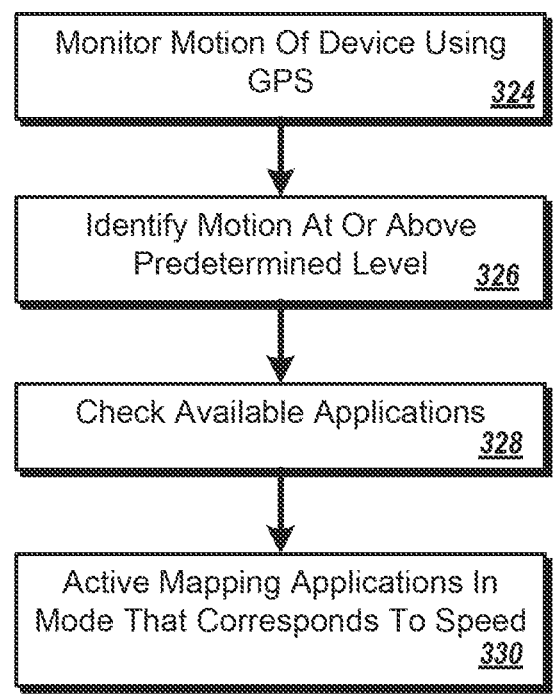
FIG. 8 is a flow chart of a process for activating a navigational application automatically in response to motion of a computing device.

FIG. 8 is a flow chart of a process for activating a navigational application automatically in response to motion of a computing device. In general, the process involves changing a display on a computing device, and generally a mobile computing device, automatically in response to changes in speed of the device.

The process begins at box 324, where a process monitors motion of a device that uses GPS functionality or other functionality such as by triangulation among cellphone towers or WiFi hot spots, among other techniques. The monitoring may occur in an event handler on the device as part of the device operating system, where various applications or other processes may register an intent to be notified when information is generated by the GPS module of the device.

At box 326, the process identifies motion at or above a predetermined level. Such a determination may be made by an event handler itself, so that a notification is provided to an application only when the speed is above a certain level. Alternatively, an application in accordance with the process described here may receive any GPS data being generated by device, and may make its own determination that a speed of the device has exceeded a predetermined level.

At box 328, the process checks available applications, which may be applications that expressed an intent to be notified when the speed of the device exceeds a certain speed. One such application may include a mapping application that may be programmed to automatically instantiate itself and become the focus of the device when the speed of the device exceeds a certain predetermined level, such as a level to indicate that a user is walking, biking, or driving from one place to another. At box 330, the process activates the mapping application, or another application, in a mode that corresponds to the speed determined by the GPS unit. For example, a first mode may relate to a low-speed motion, such as walking by a user, so that the mode displays information that is relevant to a walking user. A second mode may be triggered in response to speeds that indicate driving by the user, and may display information with a mapping application that is relevant to a driver, such as the location of filling stations and fast food restaurants near a road on which the device is moving.

In this manner, the techniques shown here may be used to automatically change a focus of a mobile device to applications that are relevant to a user who is moving with their mobile device. As a result, the user may receive information without having to expressly ask for the information, and potentially without having to remove the user's attention from walking or driving, as the case may be.

Figure 9:
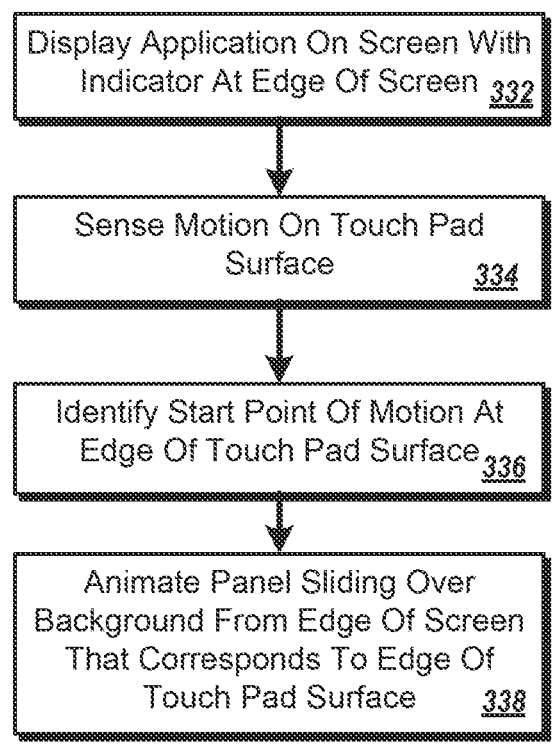
FIG. 9 is a flow chart of a process for introducing elements to a graphical display in response to user manipulation of a touch pad.

FIG. 9 is a flow chart of a process for introducing elements to a graphical display in response to user manipulation of a touch pad. In general, the process involves identifying a user motion from off the surface of a touch input mechanism and into an area on the touch input mechanism, where the start of motion is inferred as being off the mechanism by the fact that the mechanism first senses contact or motion at its very edge.

The process begins at box 332, where the device displays an application on a screen and an indicator at the edge of the screen. In this example, the indicator at the edge of the screen visually identifies to the user of the device that a normally visible element is being docked off the edge of the display of a graphical user interface. The element in this example is shown with an arrow on it so as to naturally indicate to a user that selection of the element will create some sort of motion in the direction of the arrow. Other mechanisms may also be used to indicate to a user of a graphical element is, in a sense, currently located off an edge of the graphical display.

At box 334, the process receives motion on a touch pad surface of the device, and at box 336, the device identifies a start point of the motion at an edge of the touch pad surface. The device may also identify that the motion had a velocity at the edge of the touchpad, and thus must have started off the edge of the touchpad. A device may use such determinations to identify that the motion started off the touch pad on the edge where contact is first identified as occurring, and that the input moved onto the touch pad from where it started. The device may then interpret such a motion as involving a user intent to slide an item from off a graphical user display and onto the display, from a side of the display that corresponds to the side of the touchpad from which the user slid his or her finger onto the touch pad. Such a determination may be made even if the point of contact on the touchpad would not correspond to the position on the display of the tab or other element that indicates to a user that there is an off-screen element to be brought onto the display.

At box 338, the process animates a panel sliding over the background and/or over other displayed applications on the display, from the edge of the screen that corresponds to the edge of the touchpad on which the user's input entered the touchpad. The animation may be a simple sliding into view of the element, or a more complex motion. Also, the visual element that is animated into view may take a variety of forms, such as a ribbon, panel, or toolbar. The user may hide the element again by swiping from a location on the touchpad off the edge of the touchpad.

By this process, then, a device may provide a convenient mechanism by which to extend a display, so that certain elements may be moved easily off the actual display and then moved back onto it. A user may quickly retrieve additional content without having to carefully position a pointer or other item, but may instead quickly swipe in a general area around a touch pad or similar input mechanism.

Figure 10:
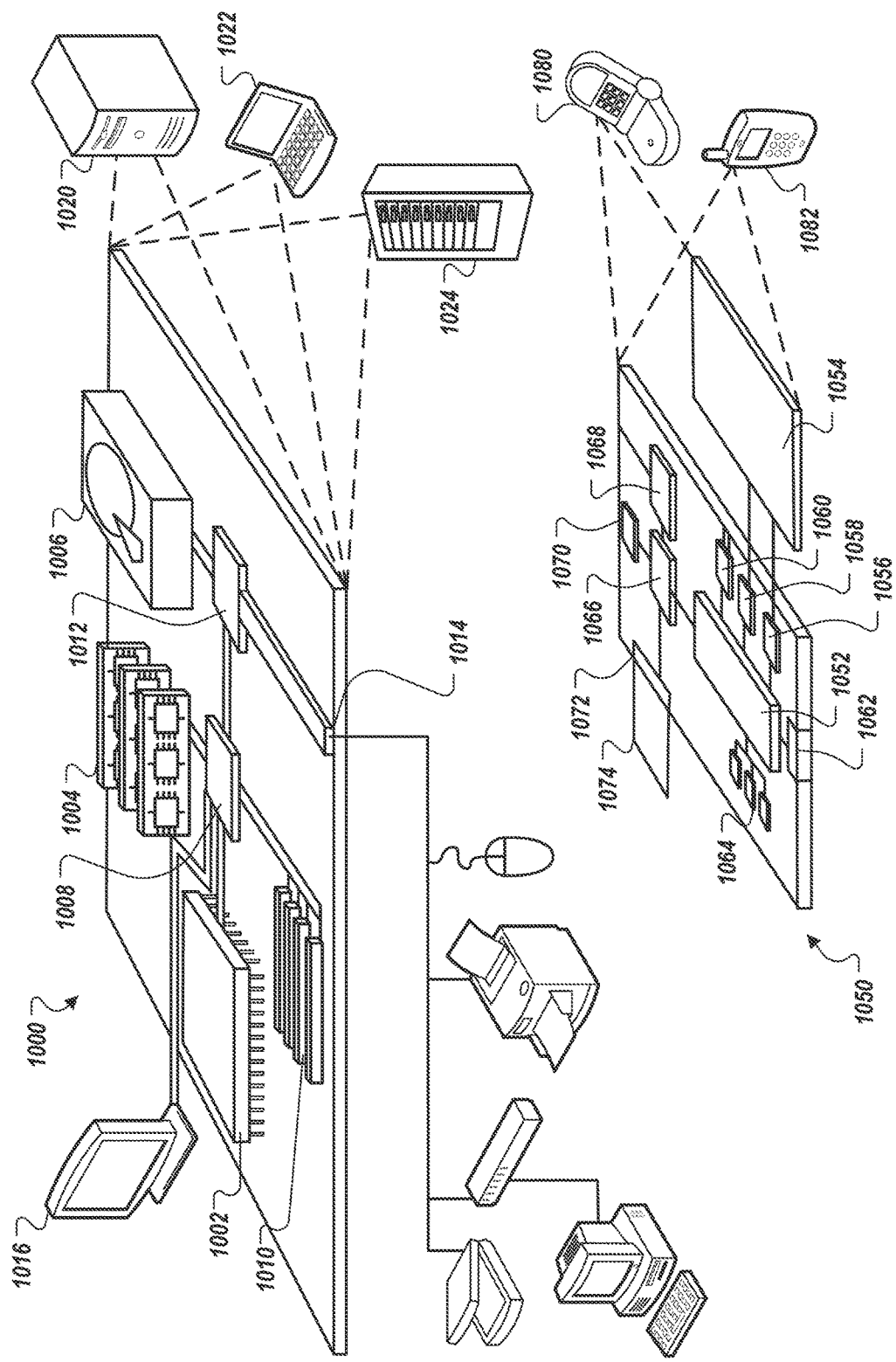
FIG. 10 shows an example of a computer device and a mobile computer device that can be used to implement the techniques described here.

FIG. 10 shows an example of a generic computer device 400 and a generic mobile computer device 450, which may be used with the techniques described here. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, memory on processor 402, or a propagated signal.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, and an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLEO (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, memory on processor 452, or a propagated signal that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, COMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to television advertisements, but other forms of future, viewership-based advertisements may also be addressed, such as radio advertisements and on-line video advertisements. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented user interface method, comprising:
    displaying content in a first window on a display of a computing device, wherein the display includes a touch input surface;
    detecting, on the touch input surface, a dragging user input from outside a peripheral edge of the first window to a location within the first window, wherein the dragging user input includes a motion having a dominant directional component generally orthogonal to the peripheral edge of the first window; and
    in response to detecting the dragging user input:
        contracting the first window on the display of the computing device, wherein the first window includes graphical elements of a first application opened within the first window,
        displaying, on the display of the computing device, a second window that was not displayed on the display on the computing device when the dragging user input was initiated, wherein the second window displays graphical elements of a second application opened in the second window or graphical elements of a new instantiation of the first application, but wherein the second window does not include a new pane of an existing instantiation of the first application, and
        displaying the contracted first window simultaneously with the second window.

2. The method of claim 1, wherein displaying the first and second windows includes automatically positioning the first window adjacent to and beside the second window.

3. The method of claim 1, wherein displaying the first and second windows comprises automatically positioning the first window adjacent to and above the second window.

4. The method of claim 1, wherein the contracted first window and the second window are the same size.

5. The method of claim 1, further comprising determining a size at which to display the contracted first window and a size at which to display the second window based on a distance of the dragging user input from the peripheral edge of the first window to the location within the first window.

6. The method of claim 1, wherein the dragging motion comprises a selection on a scroll bar followed by motion into a body of a document that is being displayed in the first window.

7. The method of claim 1, further comprising receiving a user selection of content from the displayed content in the first window and pasting the user selection of content into the displayed second window.

8. A computer-implemented user interface method, comprising:

displaying content in a first window on a display of a computing device, wherein the display includes a touch input surface;

detecting, on the touch input surface, a dragging user input on an element at a periphery of the window, wherein the element at the periphery of the window comprises a scrolling control of a scroll bar and wherein the dragging user input includes a motion having a dominant component generally orthogonal to the normal scrolling motion of the scroll bar; and in response to detecting the dragging user input:
contracting the first window on the display of the computing device, wherein the first window includes graphical elements of a first application opened within the first window, displaying, on the display of the computing device, a second window that was not displayed on the display on the computing device when the dragging user input was initiated, wherein the second window displays graphical elements of a second application opened in the second window or graphical elements of a new instantiation of the first application, but wherein the second window does not include a new pane of an existing instantiation of the first application, and displaying the contracted first window simultaneously with the second window.

9. The method of claim 8, wherein the scroll bar is a vertical scroll bar and the dragging motion comprises a horizontal motion from the scroll bar that is determined to extend for a determined distance from the scroll bar.

10. The method of claim 8, wherein the scrolling element in the scroll bar is a graphical scrolling element.

11. The method of claim 8, wherein displaying the first and second window comprises automatically positioning the first window adjacent to and beside the second window.

12. The method of claim 8, wherein the sizes of the first window and the second window are the same.

13. The method of claim 8, further comprising determining a size at which to display the first window and a size at which to display the second window based on a distance of the dragging user input from the peripheral edge of the first window to the location within the first window.

14. A computing device comprising:
a touch screen display configured to display a first window having a scroll bar at a periphery of the first window, the scroll bar having a graphical scrolling element in the scroll bar;
a dragging input sub-system configured to detect a dragging input motion that includes a contact with the touch screen display on the scroll bar and a dragging motion having a dominant directional component generally orthogonal to the normal scrolling direction of the scroll bar to a location within the first window after the occurrence of the contact, wherein the contact occurs on the touch screen display over an area where the scroll bar is displayed; and
a processor operably connected to tangible computer memory that stores code that, when executed by the processor, causes the computing device to detect a dragging input on the touch screen display from outside a peripheral edge of the first window to a location within the first window display and, in response to the detected dragging user input on the touch screen display to:

contract the first window on the touch screen display, wherein the first window includes graphical elements of a first application opened within the first window, display on the touch screen display a second window that was not displayed on the touch screen display when the dragging user input was initiated, wherein the second window displays graphical elements of a second application opened in the second window or graphical elements of a new instantiation of the first application, but wherein the second window does not include a new pane of an existing instantiation of the first application, and display the contracted first window simultaneously with the second window.

15. The computing device of claim 14, wherein the scroll bar is a vertical scroll bar and the dragging motion comprises a horizontal motion from the scroll bar that is determined to extend for a determined distance from the scroll bar.

16. The computing device of claim 14, wherein the scrolling element in the scroll bar is a graphical scrolling element.

17. The computing device of claim 14, wherein displaying the first and second window comprises automatically positioning the first window adjacent to and beside the second window.

18. The computing device of claim 14, wherein the sizes of the first window and the second window are the same.

19. The computing device of claim 14, wherein the code, when executed by the processor, further causes the computing system to determine a size at which to display the first window and a size at which to display the second window based on a distance of the dragging user input from the scroll bar to the location within the first window.

20. A computing device comprising:
a touch screen display configured to display a first window, and
a processor operably connected to tangible computer memory that stores code that, when executed by the processor, causes the system to detect a dragging user input on the touch screen display from outside a peripheral edge of the first window to a location within the first window, wherein the dragging user input comprises a motion having a dominant directional component generally orthogonal to the peripheral edge of the first window and that causes the system, in response to detecting the dragging user input to:

contract the first window on the display of the computing device, wherein the first window includes graphical elements of a first application opened within the first window, display, on the display of the computing device, a second window that was not displayed on the display on the computing device when the dragging user input was initiated, wherein the second window displays graphical elements of a second application opened in the second window or graphical elements of a new instantiation of the first application, but wherein the second window does not include a new pane of an existing instantiation of the first application and display the contracted first window simultaneously with the second window.

21. The computing device of claim 20, wherein displaying the first and second windows includes automatically positioning the contracted first window adjacent to and beside the second window.

22. The computing device of claim 20, wherein displaying the first and second windows comprises automatically positioning the contracted first window adjacent to and above the second window.

23. The computing device of claim 20, wherein the contracted first window and the second window are the same size.

24. The computing device of claim 20, wherein the code, when executed by the processor, further causes the system to determine a size at which to display the contracted first window and a size at which to display the second window based on a distance of the dragging user input from the peripheral edge of the first window to the location within the first window.

25. The computing device of claim 20, wherein the dragging motion comprises a selection on a scroll bar followed by motion into a body of a document that is being displayed in the first window.

26. The computing device of claim 20, wherein the code, when executed by the processor, further causes the computing system to receive a user selection of content from the displayed content in the first window and to paste the user selection of content into the displayed second window.

\* \* \* \* \*